US009390622B2

(12) United States Patent
Kamarianakis et al.

(10) Patent No.: US 9,390,622 B2
(45) **Date of Patent: *Jul. 12, 2016**

(54) PERFORMING-TIME-SERIES BASED PREDICTIONS WITH PROJECTION THRESHOLDS USING SECONDARY TIME-SERIES-BASED INFORMATION STREAM

(71) Applicant: International Business Machines Corporation, Armonk, NY (US)

(72) Inventors: Ioannis Kamarianakis, Yorktown Heights, NY (US); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/863,855

(22) Filed: Apr. 16, 2013

(65) Prior Publication Data

US 2014/0309976 A1 Oct. 16, 2014

(51) Int. Cl.
*G06F 7/60* (2006.01)
*G06F 17/10* (2006.01)
(Continued)

(52) U.S. Cl.
CPC .............. *G08G 1/042* (2013.01); *G08G 1/0116* (2013.01); *G08G 1/0129* (2013.01); *G08G 1/0133* (2013.01); *G08G 1/0141* (2013.01)

(58) Field of Classification Search
CPC . G08G 1/0116; G08G 1/0129; G08G 1/0133; G08G 1/0141; G08G 1/042
See application file for complete search history.

(56) References Cited

U.S. PATENT DOCUMENTS 7,813,870 B2 * 10/2010 Downs ................. G08G 1/0104 340/995.13
8,241,213 B2 8/2012 Lynn et al.
(Continued)

FOREIGN PATENT DOCUMENTS

GB 2460175 A 11/2009

OTHER PUBLICATIONS

Dunne, Mr Stephen, and Bidisha Ghosh. "Traffic flow predictions employing neural networks in a novel traffic flow regime separation technique." Proceedings of the ITRN2011 31 (2011).*
(Continued)

*Primary Examiner* — Aniss Chad
(74) *Attorney, Agent, or Firm* — Scully, Scott, Murphy & Presser, P.C.; Daniel P. Morris, Esq.

(57) ABSTRACT

A prediction modeling system, method and computer program product for implementing forecasting models that involve numerous measurement locations, e.g., urban occupancy traffic data. The method invokes a data volatility reduction technique based on computing a congestion threshold for each prediction location, and using that threshold in a filtering scheme. Through the use of calibration, and by obtaining an extremal or other specified solution (e.g., maximization) of empirical volume-occupancy curves as a function of the occupancy level, significant accuracy gains are achieved and at virtually no loss of important information to the end user. The calibration use quantile regression to deal with the asymmetry and scatter of the empirical data. The argmax of each empirical function is used in a unidimensional projection to essentially filter all fully congested occupancy level and treat them as a single state.

8 Claims, 10 Drawing Sheets

(51) Int. Cl.

| | |
|---|---|
| ***G06G 7/48*** | (2006.01) |
| ***G08G 1/042*** | (2006.01) |
| ***G08G 1/01*** | (2006.01) |

(56) References Cited

U.S. PATENT DOCUMENTS

| | | | |
|---|---|---|---|
| 2002/0165816 | A1 | 11/2002 | Barz |
| 2012/0302845 | A1 | 11/2012 | Lynn et al. |
| 2012/0330118 | A1 | 12/2012 | Lynn et al. |

OTHER PUBLICATIONS

Queen, Catriona M., and Casper J. Albers. "Forecasting traffic flows in road networks: A graphical dynamic model approach." Proceedings of the 28th International Symposium of Forecasting, International Institute of Forecasters. 2008.*

Sims, "Interpreting the macroeconomic time series facts the effects of monetary policy", Cowles Foundation Paper 823 European Economic Review 36 (1992) pp. 975-1011, North Holland.

Baxter et al., "Measuring Business Cycles: Approximate Band-Pass Filters for Economic Time Series", The Review of Economics and Statistics, Nov. 1999, 81(4): 575-593.

Campbell et al., "Consumption, Income and Interest Rates: Reiterpreting the Time Series Evidence", NBER Macroeconomics Annual 1989, vol. 4, Mar. 10-11, 1989.

O'Connor et al., "From Tweets to Polls: Linking Text Sentiment to Public Opinion Time Series", Tepper School of Business, Paper 559, Jan. 1, 2010.

Koopman et al., "Forecasting economic time series using unobserved componets time series models", Oxford Handbook of Economic Forecasting, (2011) pp. 129-162.

* cited by examiner

10

85

PERFORMING-TIME-SERIES BASED PREDICTIONS WITH PROJECTION THRESHOLDS USING SECONDARY TIME-SERIES-BASED INFORMATION STREAM

FIELD

The present disclosure relates generally to prediction methods using volatile historical time series data possessing sharp and sudden peaks and valleys, and particularly real-time traffic prediction systems and methods for volatile road occupancy data.

BACKGROUND

Time-series-based prediction is an important area of focus in numerous applications. Time-series based prediction means predicting a type of information in the future, using historical values of the same type of information. Time-series-based prediction goes by many names and covers an enormous range of applications. Some common application areas include: financial prediction (e.g. predicting the value of a stock in the future based on the history and current value of the stock), traffic prediction e.g. (predicting the traffic speed in the future on a road segment based on the current and historical speeds on that road segment), retail sales prediction (e.g. predicting the amount of retail sales for a chain of stores given their current and historical sales levels), and many more.

For example, accurate short-term forecasting of traffic variables is essential for intelligent transportation systems applications, such as real-time route guidance and advanced traveler information systems. Hence, numerous modeling approaches have been proposed, including both nonparametric and parametric models.

Traffic forecasting models are usually evaluated on data from arterials and freeways, which are admittedly less variable than data from urban networks and not subject to the effects of traffic lights. In urban networks, neighborhood relationships and the definitions of spatial weight matrices for space-time parametric frameworks, are not straightforward; some locations may not be clearly upstream or downstream a given location. Furthermore, detectors can be dense in an urban network, so that locations with useful predictive information may be hard to identify; this again affects the construction of spatial weight matrices used in space-time modeling schemes. Erroneous and missing data are expected to be more frequent in urban networks, which makes essential the implementation of robust estimation procedures.

In order to achieve an acceptably good level of prediction accuracy on urban occupancy data, a new method needs to be developed.

BRIEF SUMMARY

A prediction modeling system and method for implementing forecasting models that involve numerous measurement locations, e.g., urban occupancy (road traffic) data.

The method involves a data volatility reduction technique based on computing a congestion threshold for each prediction location, and use that threshold in a filtering scheme. Through the use of this technique, significant accuracy gains are achieved and at virtually no loss of important information to the end user.

In one aspect, there is provided a method of predicting comprising: receiving a first time-series data set having one or more values for each time point to be predicted, receiving a second time-series data set of one or more values per time point with correlation to the first time-series data, estimating a functional relationship between the first time-series data and the second time-series data, for each value, over a multiplicity of time points, determining an extremal or other specified value of the functional relationship is determined of the second time-series data as a function of the first time-series data; modifying the first time-series data based on the extremal or other specified value so that first time-series data values beyond it are set to the value of the extremal or other specified solution, and predicting a future state of the first time-series data based on the modified first time-series data, wherein as programmed processing unit performs the receiving first and second time-series data, the estimating, the determining, the modifying and the predicting.

In a further aspect, there is provided a system for predicting comprising: a memory storage device, a processor in communications with the memory storage device, wherein the computer system performs a method to: receive a first time-series data set having one or more values for each time point to be predicted, receive a second time-series data set of one or more values per time point with correlation to the first time-series data, estimate a functional relationship between the first time-series data and the second time-series data, for each value, over a multiplicity of time points, determine an extremal or other specified value of the functional relationship is determined of the second time-series data as a function of the first time-series data, modify the first time-series data based on the extremal or other specified value so that first time-series data values beyond it are set to the value of the extremal or other specified solution, and predict a future state of the first time-series data based on the modified first time-series data.

In a further aspect, a computer program product is provided for performing operations. The computer program product includes a storage medium readable by a processing circuit and storing instructions run by the processing circuit for running a method. The method is the same as listed above.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In a broad aspect, a system, method and computer program product characterizes input data to capture the salient aspects that are important to a prediction at hand, independent of the prediction algorithm employed, and thereby reduces the volatility of the data fed into whichever prediction algorithm is employed. The result is a more accurate prediction using the new reduced volatility data.

In fields or applications in which time-series-data is used by prediction models, there exist alternate time-series data that bears some correlation to the time-series data being predicted. As examples, the time-series data on the price of a stock may be related to macro-economic indicators; the traffic speed on a road segment is related to the traffic flow on that road segment; the amount of ice cream sales in a location may be related to the weather at that location.

A system and method is now described that leverages at least one alternate time-series data to improve the prediction accuracy of a first time-series data of interest. Broadly, there is redefined the data of interest via a projection to one or more values based on the relationship of that data to a different time-series data. The new, projected time-series data therefore has a lower volatility, while still capturing the important aspects of the information of interest. As a result of the lower volatility, prediction quality is improved by any state of the art prediction algorithm.

Figure 9:
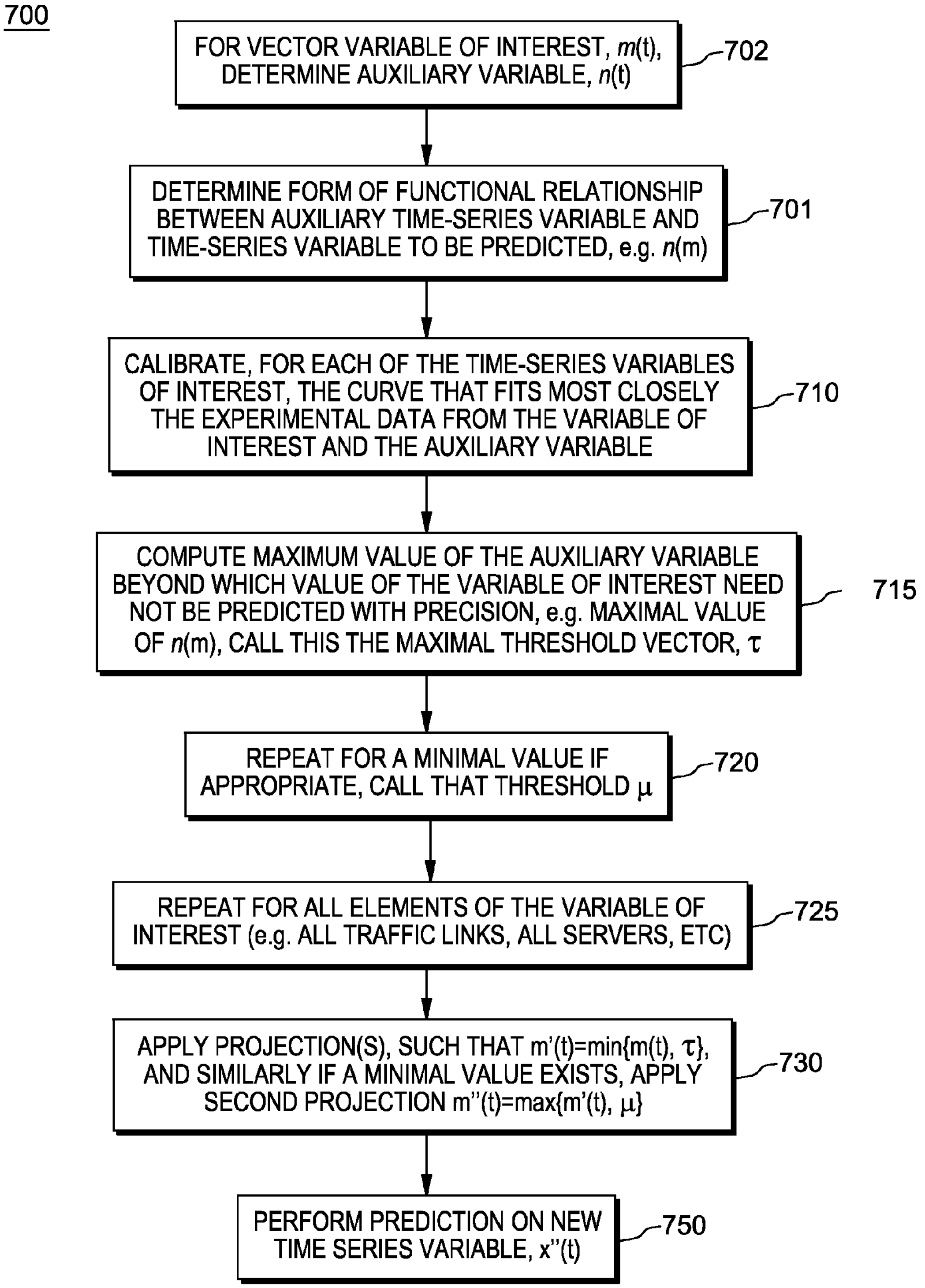
FIG. 9 illustrates a method 700 for leveraging one alternate time-series data to improve the prediction accuracy of a first time-series data of interest according to one embodiment.

Generally, FIG. 9 shows a method 700 implemented by a computing system under control of a programmed processing unit operating a set of instructions for forming, the relationship between the data of interest and the other data type. The method 700 particularly leverages one alternate time-series data to improve the prediction accuracy of a first time-series data of interest. In other embodiments, more than one alternate (second) time-series data may be considered without departing from the principles described herein.

The method uses a time-series data of one or more values for each time point to be predicted, and uses a second set of time-series data of one or more values per time point with correlation to the first time-series data. In one embodiment, the method includes estimating a functional relationship between the first time-series data and the second time-series data, for each value, over a multiplicity of time points. Further, the method includes determining an extremal or quantile value of the functional relationship of the second time-series data as a function of the first time-series data. The method then includes modifying the first time-series data based on the value of the prior extremal or quantile solution, in terms of the first time-series data, so that values beyond it are set to the value of the extremal or the quantile solution. The quantile value may be, for example, the first point in the second time-series data at which a given percent of the values fall below that quantile. Note that in a related traffic flow prediction example described herein below with respect to FIGS. 1, 4, the functional relationship would possess two such points in terms of the first data source for the quantiles of the second data source, e.g., for quantiles less than 100%. In other words, there are, in the FIG. 4, two occupancy values at which 75% of the flow data falls below a given level, on the right side of the function and on the left side. It may be desirable to use the first value of the first data source at which the given percentile is reached, or the second, in this example, depending upon the context. On the other hand, in this example, there is a single value of the first data source at which the second data source attains its maximum. Then, a prediction of the time series data is performed on the modified data using existing models.

For example, in FIG. 9 as shown at 702, the method first includes receiving a vector variable of interest, m(t), and determining an auxiliary variable, n(t). Then at 705, determining a form of functional relationship between auxiliary time-series variable and time-series variable to be predicted, e.g., n(m). Then, at 710, there is performed calibrating, for each of the time-series variables of interest, the curve that fits most closely the experimental data from the variable of interest and the auxiliary variable. Then, at 715 the method computes a maximum value of the auxiliary variable beyond which value of the variable of interest need not be predicted with precision, e.g. maximal value of n(m); this is referred to as the maximal threshold vector, $\tau$. Next, at 720, these steps are repeated for a minimal value if appropriate, with that value referred to as threshold $\mu$. Then, the method includes repeating the steps 702-720 at 725 for all elements of the variable of interest (e.g. all traffic links, all servers, etc). Continuing at 730, the method includes applying projection(s), such that $m'(t)=\min\{m(t), \tau\}$, and similarly if a minimal value exists, applying a second projection $m''(t)=\max\{m'(t), \mu\}$. Finally, at 750 there is performed a prediction on the new time series variable, m''(t) using a traffic prediction model.

The system and method thus leverages an auxiliary or secondary time-series data source as a projection pre-processing step to any traffic prediction method employed. The resulting projected data leads to increased prediction accuracy while maintaining the salient aspects of the original data set as required, for rexample, by traffic management and route guidance applications.

There is now described an example prediction method that considers a time-series data of interest to be traffic occupancy levels on a road network. Traffic occupancy levels are typically detector-specific (a typical detector is an induction loop: an electromagnetic detection system which uses a moving magnet to induce an electrical current in a nearby wire) but may also be link-specific, and range from 0 to 100, for example, representing the percent of time that the detector is occupied by a vehicle in a pre-defined period of time (e.g. 5 min). When the source of the traffic occupancy data is an inductive loop detector, the occupancy measurement will be specific to that detector. If the source of the traffic occupancy data covers a road segment, e.g. through individual vehicle counts over a segment or some other form of traffic data collection, the occupancy level may represent an average occupancy over a link, or road segment. Traffic occupancy levels on a road network are typically updated in real-time, e.g. every 5 minutes, and as such constitute a time-series-based data stream.

The prediction system and method is useful to be able to predict traffic occupancy into the near-term future (e.g., 15 minutes, 30 minutes, etc. in advance for purposes of traffic regulation and traffic information and route guidance. Many algorithms are used for traffic prediction (see, e.g. Min and Wynter, 2011 and references therein). Traffic occupancy levels are known to be highly volatile and therefore difficult to predict using any known prediction algorithm.

Thus, in an exemplary embodiment, the system and method described herein define a relationship between traffic occupancy data (first time-series data) and another data stream, in this case, traffic volumes (alternate time-series data). Traffic volume data is produced in real-time like traffic occupancy data, e.g., usually on a same update frequency (e.g., every 5 min).

The importance of forecasted occupancy levels is significant for numerous applications from traffic management and signal timing adjustment to route guidance tools. Indeed, occupancy data is often available at or near signalized intersections where such applications are required.

Congestion Threshold Projection

Figure 1:
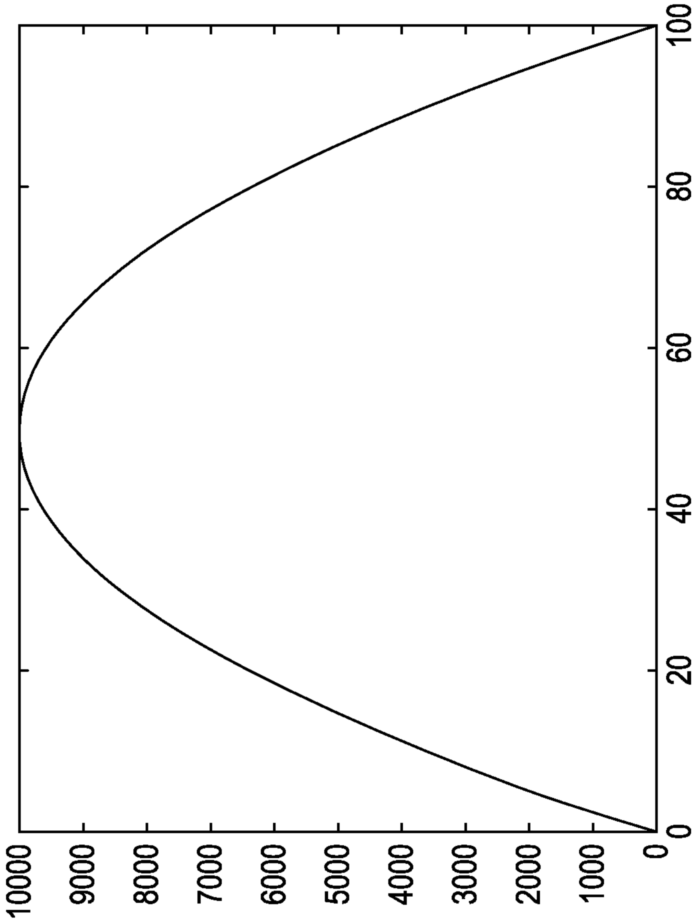
FIG. 1 depicting an example empirical curve 10 defined by real traffic volume on the y-axis and traffic occupancy on the x-axis for a given traffic detector in a city.

The relationship linking real traffic volume to traffic occupancy is roughly in the form of a quadratic function as shown below in FIG. 1 depicting an example empirical curve 10 defined by real traffic volume on the y-axis and traffic occupancy on the x-axis for a given traffic detector in a city.

However, in spite of the benefits accrued by using a state-of-the-art prediction methodology on many types of traffic data, occupancy levels pose a particular challenge to traffic prediction models. This is due to a number of different factors, but the high volatility of the occupancy data on urban networks is a significant one. In particular, in view of FIG. 1, the data distribution exhibits a heavy tail on the right whose shape tends to vary daily and weekly. This means that the range of values is not well defined, e.g. by a Normal distribution or truncated Normal distribution, around a mean value with values tapering off sharply at the extremes, or at the rightmost or highest extreme. This means that the data takes on a wide range of values including some extreme values which in the occupancy prediction example are typically related to traffic incidents (e.g. accidents, broken down vehicles), causing problems for the accuracy of the prediction.

Figure 2A:
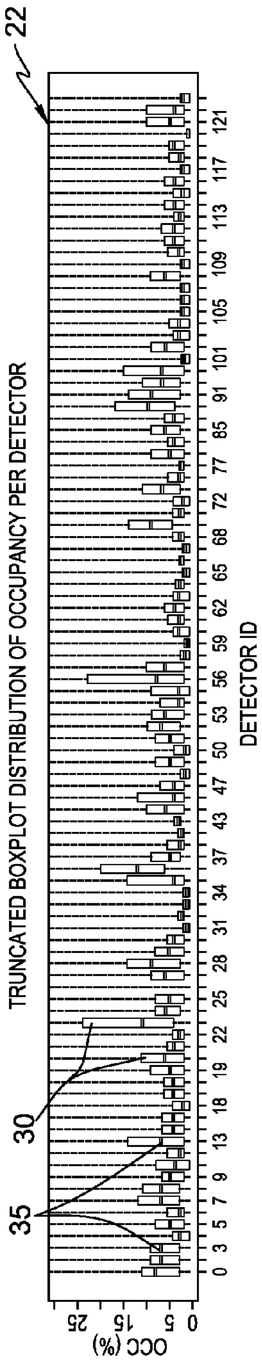
FIGS. 2A-2D illustrate respective boxplots having example occupancy data for multiple detector locations in an example city or urban network.
Figure 2B:
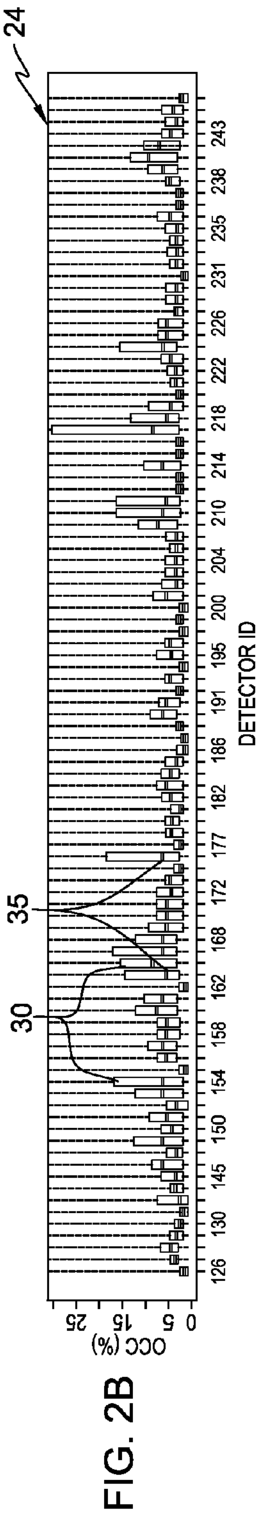
Figure 2C:
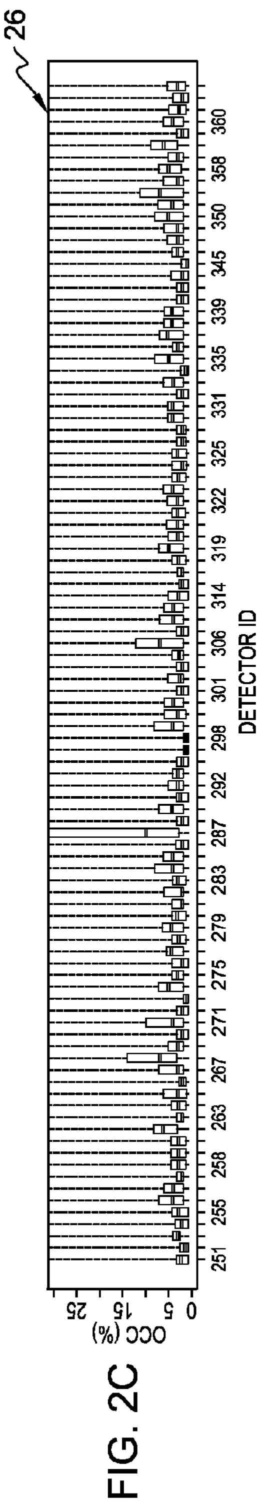
Figure 2D:
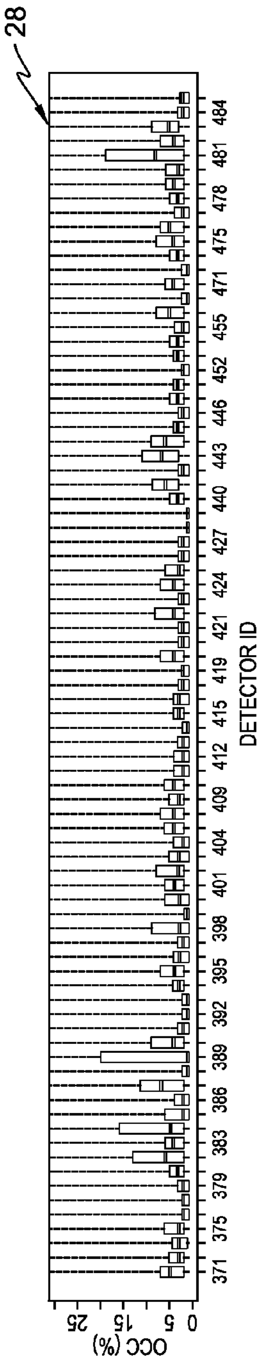

Consider, for example, FIGS. 2A, 2B, 2C and 2D showing respective boxplots 22, 24, 26 and 28 for the occupancy data (plotted on y-axis) over 383 detector locations (plotted on x-axis) in an example urban road network (City of Lyon, France). While FIG. 2D illustrates distributions of up to 495 detector IDs, there are gaps. The occupancies data obtained at the 383 measurement locations of a city network was collected over a calibration period (e.g., 13 weeks in a non-limiting embodiment); the y-axis is truncated to a maximum occupancy of 25 to improve visibility. For each detector 21 represented in a boxplot, a respective box 30 provides a range of occupancy values, e.g., an example range from the 25th to the 75th percentiles. The horizontal lines 35 in each box 30 provide a computed median value for the occupancy for that detector. A very large spread of values is observed after the $75^{th}$ percentile of each distribution. Furthermore, as shown in the boxplots of FIGS. 2A-2D, the upper limit of the detected traffic occupancy is truncated at 30 so as to permit the box itself to be visible at all, but values continue up to nearly 100.

In practice, however, in an urban road network, the occupancy levels on the far right of the distribution (e.g., see FIGS. 3A, 4) are unreliable and of little use to applications. Predictions of occupancy should identify the free flow condition, the transition phase, and the occupancy level in the transition phase, as well as as the congested state. However, the precise occupancy level once in the fully congested state is of little use.

Because the principal difficulty in achieving acceptable prediction accuracy on occupancy data stems from the volatility of the data on the right side of the distribution, the system and method herein is implemented to reduce the volatility while still maintaining the important signal in the original data. As described above, the signal needed from the data is primarily the type of state as well as the transition phase between uncongested and fully congested.

Thus, a valid volatility reduction procedure for the traffic occupancy data is provided. With that in hand, a prediction methodology may be applied (re-applied) to a new data feed, $\hat{y}$, with improved prediction performance.

The proposed approach involves a type of low-pass filtering where the cutoff threshold should be defined precisely by the point at which the fully congested state is achieved. In other words, it is sufficient for a transport management center to know that (i) either a current or predicted state is/will be fully congested, or (ii) the actual or predicted occupancy level, if it is/will be below the fully congested state. Hence a purely categorical model is not sufficient. Using a cutoff filter which is too low would negate the benefit of the occupancy prediction and a value too high would not reduce volatility sufficiently to achieve acceptable prediction accuracy.

Input to the method is the identification of the threshold level $\tau$, at which the congested state is achieved, for every detector, s, with enough accuracy to maintain the critical occupancy level in the transition phase, yet reduce volatility enough to permit accurate prediction.

Figure 3A:
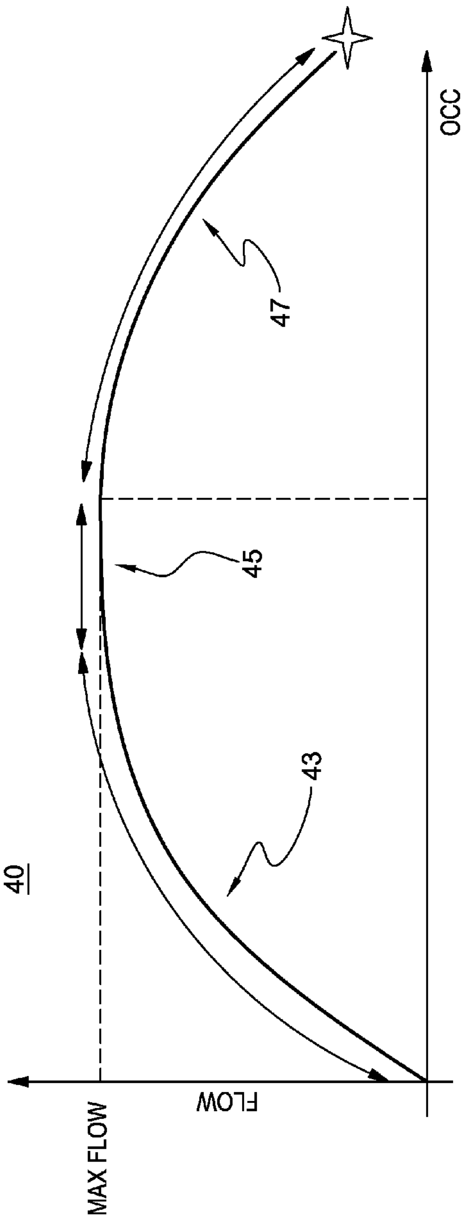
FIG. 3 shows an exemplary curve representing traffic flow versus occupancy having a top middle section illustrating a transition phase.
Figure 3B:
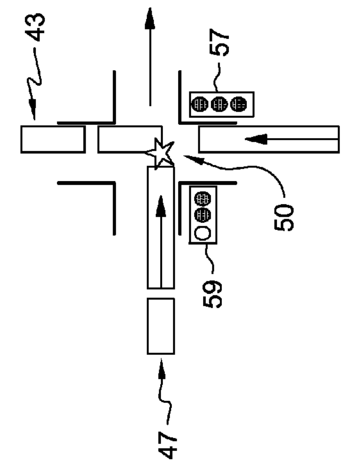

FIG. 3A is an example curve 40 relating traffic flow to occupancy. A top middle section 45 of the curve 40 illustrates the transition phase. FIG. 3B shows an example urban road crossroad or intersection 50 depicting when a minimum traffic flow 47 is reached for high values of occupancy as a function of blockages at a traffic signal, e.g., indicated as a result of a traffic-light red cycle 57. In FIG. 3A, traffic is modeled as moving freely as indicated as a traffic flow 43. This flow 43 corresponds in FIG. 3B as result of a traffic-light green cycle 59 that allows all waiting cars to get through the crossroad. Returning to FIG. 3A, as indicated by traffic flow 45 in the curve 40, traffic is getting heavy. In view of FIG. 3B, this means that the number of vehicles in the queue is larger than the crossroad flow capacity during a traffic-light green cycle. Some cars have to wait a second green cycle to get through the crossroad 50. An indication that traffic is congested and is getting even more congested in the time is indicated as traffic flow 47 in FIG. 3A. The traffic flow values are decreasing. The crossroad 50 in FIG. 3B is probably obstructed, as a result cars can't easily cross. This pattern illustrates that the crossroad is not functioning correctly.

In general, a congestion threshold is a function of numerous parameters including road geometry, the location of traffic signals, etc. and can be complex to model precisely as shown in FIG. 3B. Hence, a data-driven approach is used to determine these values for each detector.

For the prediction method, there is defined the functions $q_s(y_s(t))$ where q(t) is the volume (second or alternate or auxiliary time series data) and the occupancy is y(t) (first time series data) and s represents the detector(s), e.g., detector location(s) or network link for which a traffic condition(s) is/are sought to be forecasted. Here, for example purposes, use is made of the volume and occupancy data from detectors in the example city (e.g. Lyon, France). Due to the high variability of the data, two robust estimation approaches for $q_s(y_s(t))$ were tested. Both methods make use of parametric quantile regression, defined as solving an expression as follows:

$$\min_{\alpha\in\Re^k}\sum_{s=1}^{S}\rho(\hat{q}_s(\hat{y}_s)-\xi_s(q_s(y_s),\alpha)).$$

Quantile regression is beneficial in this setting, and offers different results from a mean regression because of the asymmetry of the conditional density and the influence of the dispersion of the flow values as occupancy increases. In this setting, ζ are second-order functions with zero intercept. In one embodiment, ρ=0.5 which computes a median regression. In a second embodiment, a more conservative approach is taken and estimates the outer envelope of the data. In one embodiment, there is used ρ=0.9 to represent the 90th quantile as a proxy for the outer envelope.

Figure 4:
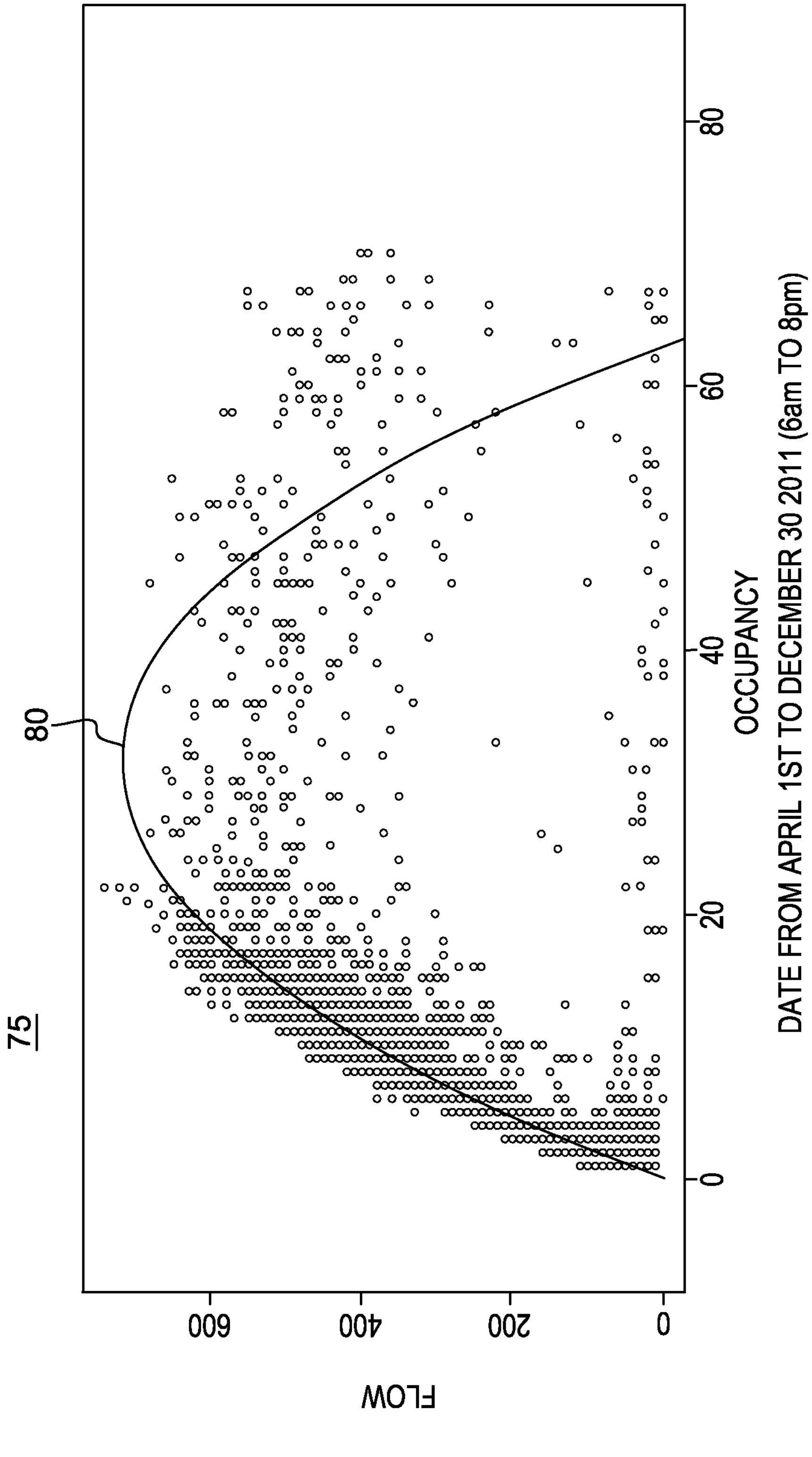
FIG. 4 illustrates an example result of a median regression second-order curve fit on $q_s(y_s)$, and particularly shows an empirical scatterplot of the flow data in a road segment as a function of the occupancy.

FIG. 4 illustrates an example result of a median regression second-order curve 80 that is fit on $q_s(y_s)$, and particularly shows an empirical scatterplot 75 of the flow data (Y-axis) in a road segment as a function of the traffic occupancy (X-axis). In this example, a plot of traffic occupancies, data volatility tends only to be problematic for high levels of occupancy; at low occupancies, data is smooth over time, in general.

Hence, only one projection threshold is needed, above which higher traffic occupancies are projected to the threshold. The threshold in this case represents the level at which the congested traffic state is reached. It is important to have predictions of the traffic occupancy for various purposes, but if the traffic state is considered "congested" then it is enough to know that it is "congested" and the precise occupancy level at or after that point is not of use. On the other hand, it is very important to know the occupancy level before that point of congestion so that control action can be taken in a timely fashion.

Therefore, the use of the alternate time series data is to enable the establishment of the congestion threshold for each detector. The real-time and historical occupancy data are then projected to that threshold for all values equal to or above the threshold. Prediction is performed in the new, projected data. Because the data exhibits less volatility, prediction quality is in general considerably improved, independently of the prediction technique employed.

Figure 5:
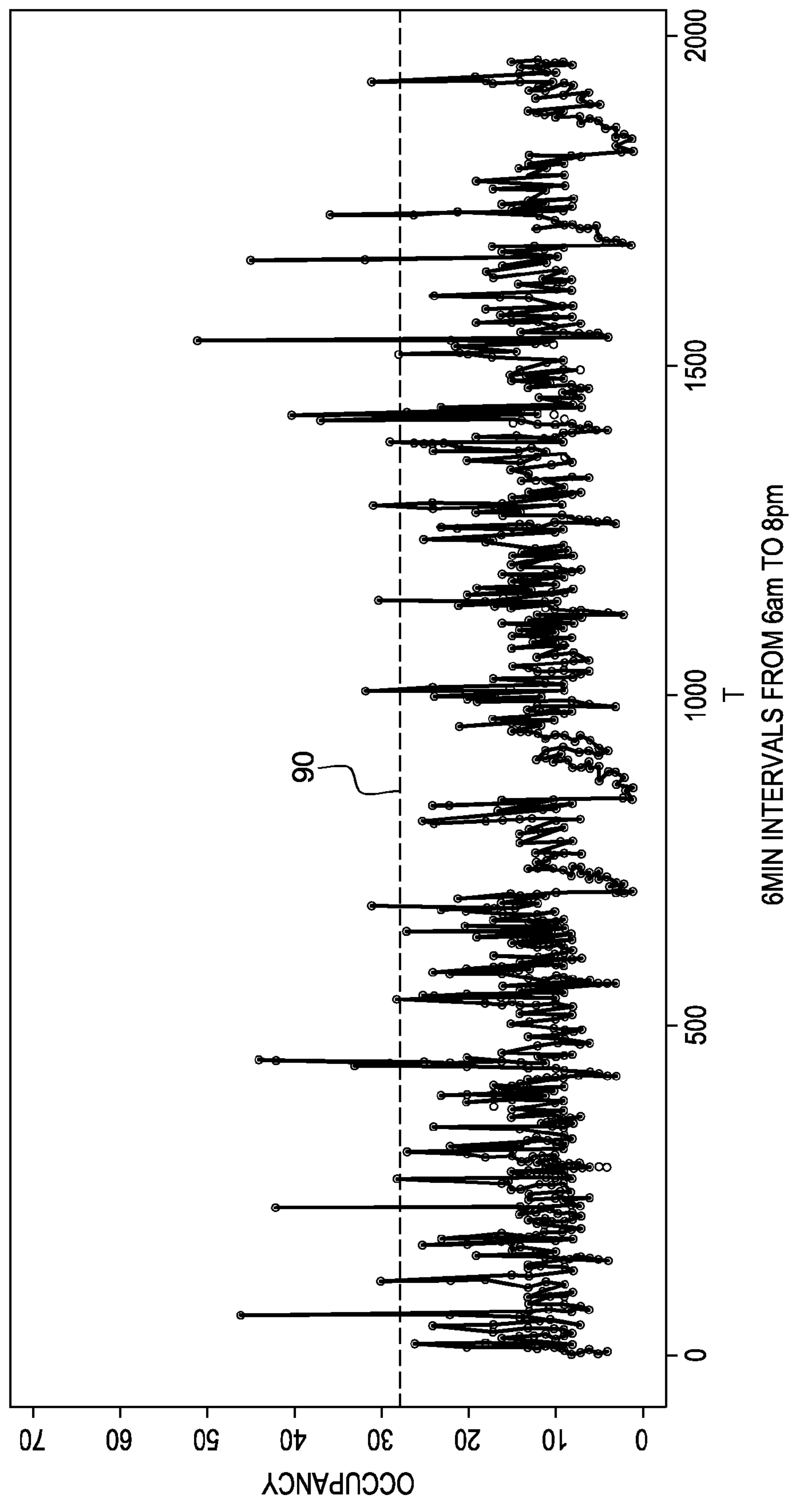
FIG. 5 shows example occupancy data for a given traffic detector over time with a computed flow-based congestion threshold associated with that traffic detector illustrated as a horizontal line in one embodiment.

FIG. 5 shows a plot 85 of an example traffic occupancy (Y-axis) for a given traffic detector data over time (e.g., time intervals on X-axis) with an example computed flow-based congestion threshold associated with that traffic detector illustrated as a horizontal line 90.

The next step in the method involves obtaining the argmax, $\tau_s$:=argmax$q_s(y_s)$, of each calibrated curve, for every detector, s. Hence, $\tau_s$ represents the occupancy level at which the fully congested state occurs at detector s. Then, the congestion threshold method performs a unidimensional projection of the occupancy level onto that threshold according to the following expression:

$$\hat{y}_s=\{y_s,\tau_s\}^-,$$

where $\{\cdot\}^-$ is the min operation, i.e., the minimum of the two values within the { }.

Figure 6A:
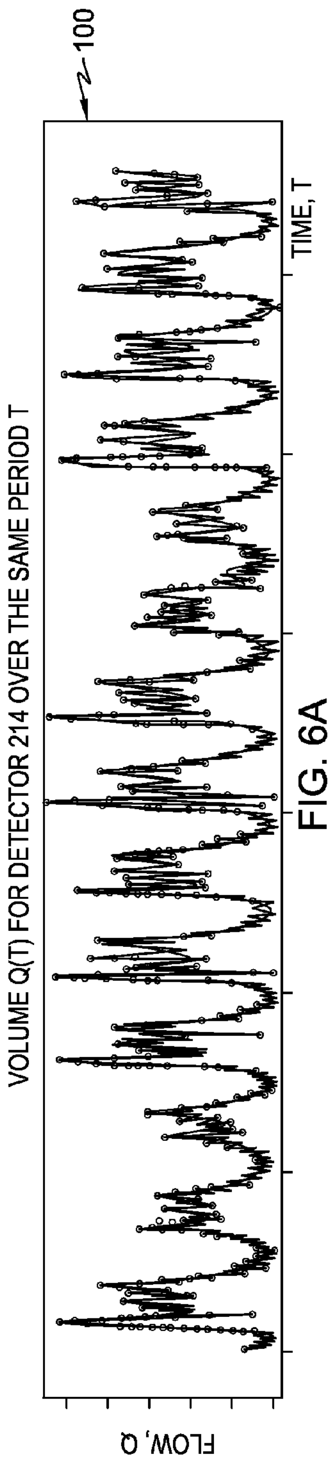
FIG. 6A depicts corresponding volume time series data obtained from the detector s for an example time period as a plot 100 in an example implementation.
Figure 6B:
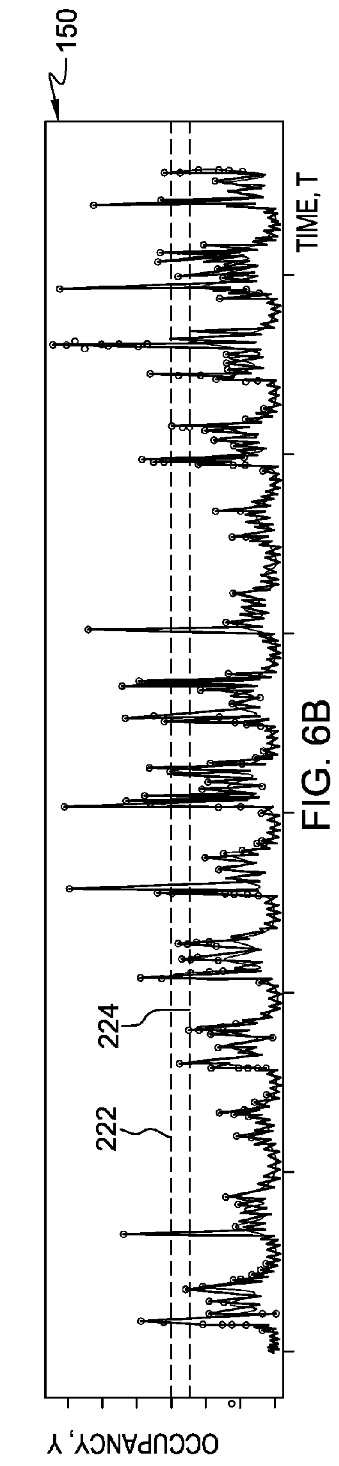
FIG. 6B shows a plot 150 of the estimated (occupancy) congestion thresholds 222, 224 on occupancy data for a period of time that correspond to the argmax $\tau_s$ projections 212, 214 respectively for the outer envelope curve 202 and for the 0.5 median curve fit 204 of FIG. 6C.
Figure 6C:
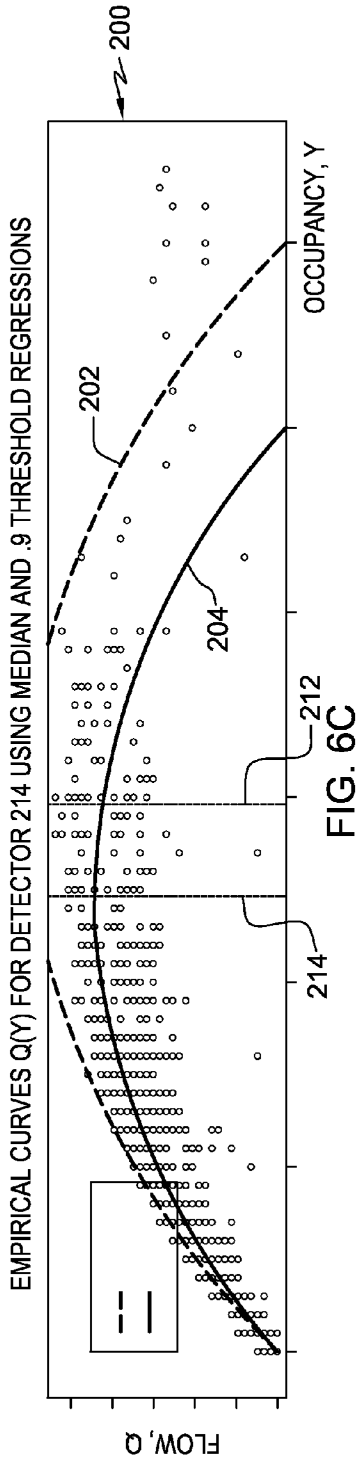
FIG. 6C shows a plot 200 of both a threshold constrained median (0.5) regression curve fit 204, and a constrained outer envelop (0.9) quantile regression second-order curve 202 fit on the example $q_s(y_s)$ along with respective corresponding projections of the argmax $\tau_s$ of each regression on the occupancy data from a given example detector.

FIGS. 6A-6C depict location-specific congestion-threshold estimation as being based on a variant of the constrained-quadratic Occupancy-Flow relationship, e.g., a specific curve-fitting performed on the 0.9 quantile of flows.

For example, FIG. 6C shows an example occupancy volume scatterplot 200 obtained based on data from a detector s over a particular time period, hours, days or months. FIG. 6C depicts a relation to construct and calibrate $q_s(y_s)$ for the single detector s by calculating the value of the maximum of the relationship and defining τ as the value of the first time-series data at which the maximum is obtained, i.e:

$$\tau=\text{argmax}\,q(y)$$

FIG. 6C particularly shows a plot 200 of both a threshold constrained median (0.5) regression curve fit 204 (the intercept equals zero), and a constrained (the intercept equals zero) outer envelop (0.9) quantile regression second-order curve fit 202 on the example $q_s(y_s)$ along with respective corresponding projections of the argmax $\tau_s$ of each regression on the occupancy data from the given detector. Particularly, the 0.9 quantile regression curve fit 202 shows a corresponding argmax $\tau_s$ projection 212, and for the 0.5 median curve fit, a corresponding argmax $\tau_s$ projection 214. The 0.9 regression thresholds are shown above the median values. The outer envelope curve 202 quadratic quantile regression fit for the 0.9 quantile of flows corresponds to the level of occupancies for which the maximum predicted flow is achieved, and is designated as a threshold in occupancies—it marks heavily congested traffic conditions, and is used as a projection threshold to filter occupancies, both observed and forecasted values.

FIG. 6B shows a plot of the estimated congestion thresholds 222, 224 on occupancy data for a period of time, e.g., months, wherein estimated congestion threshold 222 corresponds to the argmax $\tau_s$ projection 212 for the outer envelope curve 202, and estimated congestion threshold 224 corresponds to the argmax $\tau_s$ projection 214 for the 0.5 median curve fit. The plot 150 in FIG. 6B reveals the occupancy data y(t) comprising the variable to predict. That is, the traffic occupancy is the variable to predict by computing:

$$\hat{y}_s(t)=\min\{y(t),\tau)$$

The corresponding volume time series data obtained from the detector s for the same example time period is shown in the plot 100 of FIG. 6A for comparison purposes. The example plot 100 depicts the auxiliary data stream q(t) here, the traffic volume for the detector s.

Thus, alternately stated, the computer-implemented system and method herein transforms continuous variables and the corresponding forecasts (irrespective of the model used to produce them) to hybrid continuous-ordinal variables, by projecting values larger (or smaller) than location-specific (congestion) thresholds to these thresholds. For example, after a threshold in occupancies is reached, forecasts are as accurate as long as they are equal or larger than this threshold.

The method thus computes $\hat{y}_s$ as the new filtered occupancy data for every detector s. Prediction of occupancy using the $\hat{y}_s$ makes use of the prediction method described herein above. Comparative results are now presented.

Figure 7A:
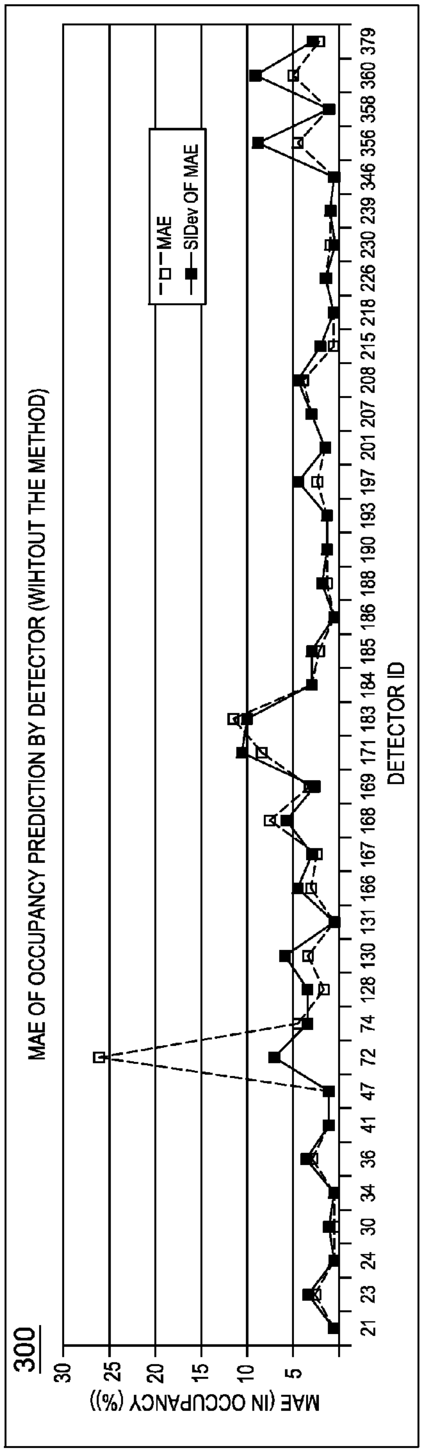
FIG. 7A shows an example plot 300 of the Mean Absolute Error (MAE) and the Standard Deviation of the error of the occupancy predictions (e.g. 1-step forecasts) for a set of example detectors (measurement locations) without using the congestion threshold volatility reduction method over 10 time points during the morning peak in one example.
Figure 7B:
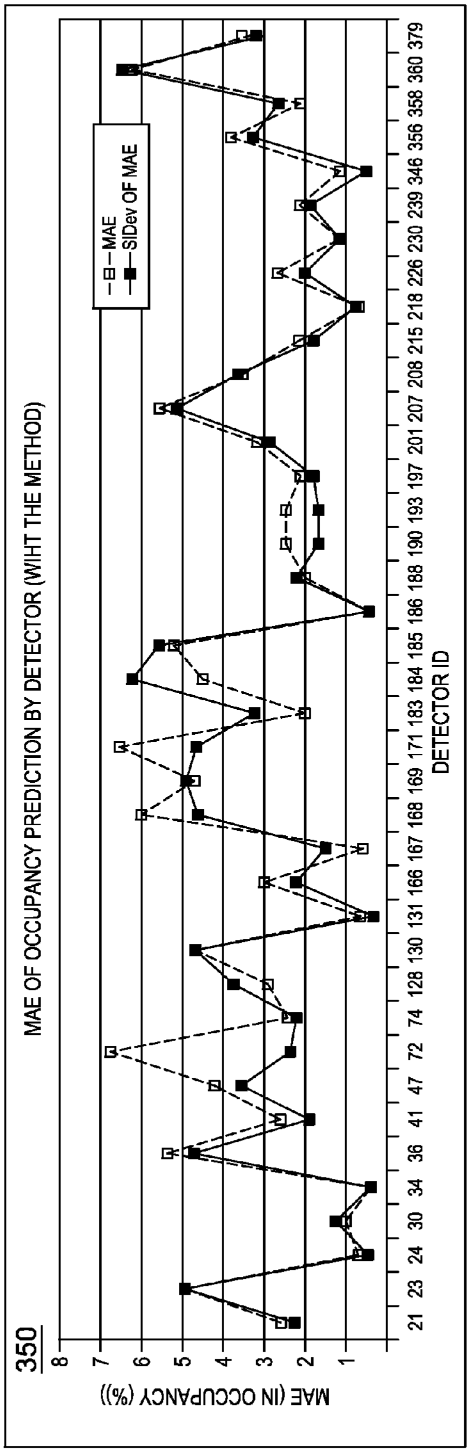
FIG. 7B shows an example plot 350 of the Mean Absolute Error (MAE) and the Standard Deviation of the error of the occupancy predictions for the same set of detectors as in FIG. 7A, using the congestion threshold volatility reduction method over 10 time points during the morning peak in the example.

FIGS. 7A-7B illustrate the benefit on a set of detectors, e.g., 39 detectors, over a morning peak period, with 10 data points per detector. Mean absolute error (MAE), i.e., $MAE=\Sigma_{s=1 \ldots S}|y_s-\hat{y}_s|$, with (FIG. 7B) and without (FIG. 7A) the method are presented, where ŷ are the predicted data and y the actual occupancies. Note that the scales of the y-axis in the two figures are different owing to a large error in the figure without use of the method (e.g., FIG. 7A). In general, the large errors were eliminated via the method, allowing the good performance of the prediction method on the less volatile data to dominate.

More particularly, FIG. 7A shows an example Mean Absolute Error (MAE) and the Standard Deviation of the prediction error plot 300 for occupancies observed at a set of measurement locations (detectors) without using the congestion threshold volatility reduction method over 10 time points during the morning peak period.

FIG. 7B shows a Mean Absolute Error (MAE) and the Standard Deviation of the prediction error plot 350 for occupancies observed at the same set of detectors as in FIG. 7A using the congestion threshold volatility reduction method over 10 time points during the morning peak in the example.

Figure 8A:
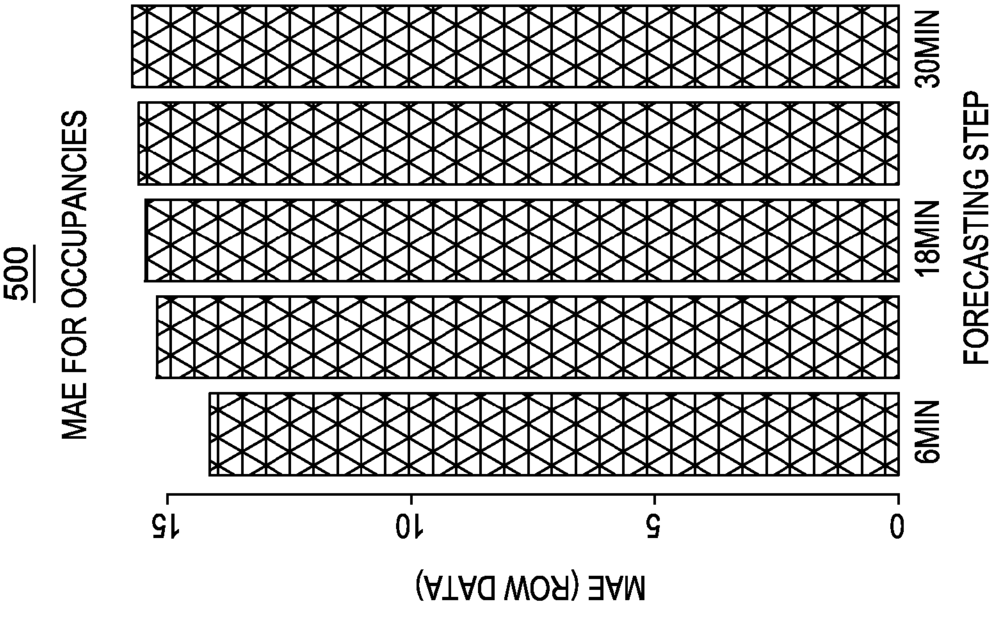
FIG. 8A shows an example sample overall (across the set of measurement locations depicted in FIG. 7) Mean Absolute Error (MAE) of occupancy predictions (occupancy is expressed as a percentage) of time-series prediction of occupancy data without using the congestion threshold volatility reduction method.
Figure 8B:
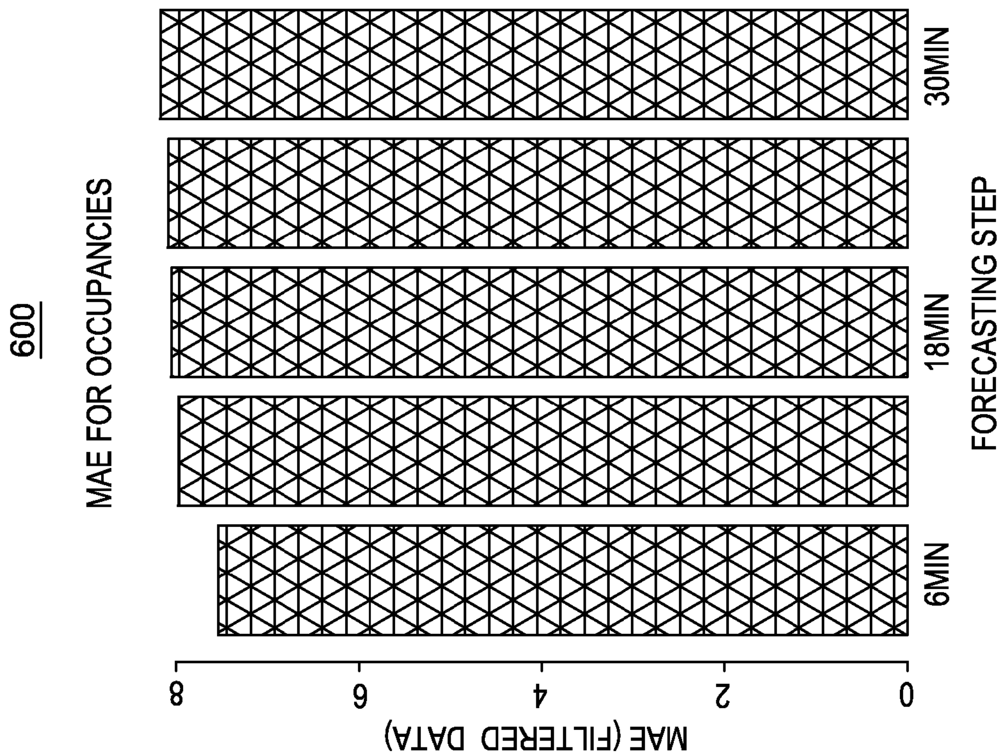
FIG. 8B shows an example sample overall Mean Absolute Error (MAE) of occupancy predictions of time-series prediction of occupancy data using the congestion threshold volatility reduction method.

The pair of bar charts in FIGS. 8A and 8B show on a larger dataset the impact of the congestion threshold method, by prediction horizon from 6 minutes up to 30 minutes into the future. As before, note the different scales on the y-axis of the two charts. Again, MAE were reduced dramatically. In particular, FIG. 8A further shows an example plot 500 sample average absolute error of time-series prediction of occupancy data without using the congestion threshold volatility reduction method. Accuracy is indicated as “MAE” meaning “mean absolute error”, i.e. an average of ABS (true—predicted) over all traffic detectors and all time steps.

FIG. 8B shows an example sample average absolute error plot 600 of time-series prediction of occupancy data implementing the methods described. Accuracy is indicated as “MAE” meaning “mean absolute error”, i.e. an average of ABS (true—predicted) over all traffic detectors and all time steps. Note that the considerably lower error level (e.g., error level of 7-8 for the plot of FIG. 8B with the methods, versus an error level of 13-15 for the plot of FIG. 8A without using the methods described).

Thus, the system and method leverages at least one alternate time-series data to improve the prediction accuracy of a first time-series data of interest. The method redefines the data of interest via a projection to one or more values based on the relationship of that data to a different time-series data. The new, projected time-series data therefore has a lower volatility, while still capturing the important aspects of the information of interest. As a result of the lower volatility, prediction quality is improved by any state of the art prediction algorithm.

The method is applicable to perform accurate predictions for all times of time series data, e.g., financial data. In general, financial data, such as stock prices, are highly volatile. However, in many cases it is not necessary to predict accurately the full range of stock ticker prices, but only the price in between one or two thresholds. For example, if stops are put in place wherein a stock would be bought if the price falls to some level or sold if it rises to some level, then it would be useful to predict the stock price in between those levels but not necessarily above or below those levels. In order to use the present methods, a secondary source of data would be needed to determine what those levels should be, and then the financial data would be projected from below to the lower level and/or from above to the higher level. The prediction algorithm would then be run on the projected data.

In one embodiment, a predictive modeling strategy employed divides traffic dynamics into two basic components: a location specific daily profile and a term that captures the deviation of a measurement from that profile. For traffic volumes, a daily profile is expected to be shaped as an asymmetric “M” whereas for speeds as an asymmetric “W”. Let d be the day-of-the-week index, s the location index and t the time-of-day index. The overall model structure for a traffic variable y is governed by equation 1) as follows:

$$y_{d,s}(t)=\mu_{d,s}(t)+x_{d,s}(t) \tag{1}$$

where d=1, . . . , D, s=1, . . . , S, and t=1 . . . , T. S represents the number of locations for which traffic conditions are sought to be forcasted, and T is the total number of time intervals per day. D may be less than seven if there is sufficient evidence of similarity of traffic dynamics for two (or more) days of the week.

The profile $\mu_{d,s}$ captures the daily trend and can be viewed as a baseline forecasting model that is based only on historical data and neglects information from the recent past of the process. $\mu_{d,s}$ can be obtained by some form of weighted average that weighs more heavily recent historical data, principal component analysis, wavelet based decomposition or by an exponential smoothing filter. Decompositions are adopted very frequently in time-series analysis and within the context of short-term traffic forecasting are expected to lead to superior performance compared to models applied directly to traffic variables.

The second stage of the modeling procedure concentrates on the dynamics of the (short-term) deviation from the historical daily profile and adopts a regime-switching modeling framework. Specifically, for each location s a space-time threshold autoregressive model is adopted to account for transient behavior according to equation 2) as follows:

$$x_{d,s}(t)=\alpha_{d,s}^{(r_{d,s})}+\sum_{i=1}^{p}\alpha_{i_{d,s}}^{(r_{d,s})}x_{d,s}(t-i)+\sum_{j=1}^{N_s}\sum_{i=1}^{p}\alpha_{j,i_{d,s}}^{(r_{d,s})}x_{d,j}(t-i)+\varepsilon_{d,s}(t) \tag{2}$$

where $$t=T_{r_{d,s}-1}+1, \ldots , T_{r_{d,s}}$$

for $r_{d,s}=1 \ldots , R_{d,s}+1$ and a convention is used such that $T_0=0$ and $$T_{R_{d,s}+1}=T.$$

The index $r_{d,s}$ specifies the operating regime. The thresholds $$T_{1_{d,s}}, \ldots , T_{R_{d,s}},$$

separate and characterize different regimes and in general may differ for different locations in the road network and different days of the week. In one embodiment, the number of thresholds and their magnitude are unknown quantities that need to be estimated.

The above predictive equation contains an intercept term that varies with location, traffic-regime within a day and day of the week. $N_s$ is the number of neighboring locations of s that may provide useful information (at some previous time instances) with regard to short-term forecasting performance and p is the autoregressive order (maximum time-lag) of the model. Hence the first sum in (2) contains information on the recent past of the location of interest whereas the second sum contains information from its neighbors. The α's are unknown coefficients that need to be estimated; the statistically significant ones in the second sum signify which temporal lags of a neighboring location are expected to provide useful information with regard to short-term forecasting. The i in the expression (t−i) refers to the time lag, i.e. a time stamp prior to time t in terms of a number of periods. For instance, if i=2, then t−i is two time periods prior to time t. Finally, ϵ is assumed to be a martingale difference sequence with respect to the history of the time series up to time t−1; hence, it is assumed a serially uncorrelated (but not necessarily independent) sequence and its variance is not restricted to be equal across regimes.

The above model defines a threshold regression per measurement location, with an unknown number of regimes. Time-of-day is the threshold variable that defines subsamples in which the regression relationship is stable. Within regime $r_{d,s}$, (2) is a linear regression model that can be estimated using existing methods such as minimizing the least squares deviation (OLS, also known as the L2 norm) or the least absolute deviation (LAD, also known as the L1 norm). However, direct estimation is expected to be inefficient as a fraction of the predictors will not contribute significantly to the predictive power of the model. Furthermore, direct estimation may be problematic (the variances of the estimated coefficients may be unacceptably high) or even infeasible due to multi-collinearity, especially when p and $N_s$ are large.

In one embodiment, estimation and model selection per regime take place simultaneously for each location, using lasso penalized regression which enforces sparse solutions in problems with large numbers of predictors. Lasso is a constrained version of ordinary estimation methods and at the same time a widely used automatic model building procedure. Given a loss function g(.), lasso penalized regression within regime $r_{d,s}$ can be phrased as minimizing the criterion according to equation 3) as follows:

$$f(\varepsilon) = g(\varepsilon) + \lambda\left(\sum_{i=1}^{p} \left|\alpha_{i_{d,s}}^{(r_{d,s})}\right| + \sum_{j=1}^{N_s}\sum_{i=1}^{p} \left|\alpha_{j,i_{d,s}}^{(r_{d,s})}\right|\right) \tag{3}$$

where, given that historical traffic data from $D_w$ past weeks are available, for lad-lasso $$g(\varepsilon) = \sum_{k=1}^{D_w} \sum_{i=T_{r_{d,s}}-1}^{T_{r_{d,s}}} |\varepsilon_{d,s}(t)|$$

whereas for conventional lasso $$g(\varepsilon) = \sum_{k=1}^{D_w} \sum_{i=T_{r_{d,s}}-1}^{T_{r_{d,s}}} (\varepsilon_{d,s}(t))^2.$$

The second component of the sum is the lasso penalty term which shrinks coefficients toward the origin and tends to discourage models with large numbers of marginally relevant predictors. In one embodiment, the intercept $\alpha_{d,s}$ is ignored in the lasso penalty, whose strength is determined by the positive tuning constant λ.

In one embodiment, the use of penalized estimation allows considerable flexibility with regard to the specification of matrices that define neighboring relationships in a road network. Using a modeling framework similar to those known in the art, different such matrices per regime and per time-lag of the model are defined at a pre-processing stage which would have been tedious for large S. By using a "lasso" technique there is defined a matrix that contains all neighboring associations that are relevant to the chosen autoregressive order. The automatic model selection feature of lasso shrinks towards zero the coefficients that correspond to non-significant time-lags of measurements taken at neighboring locations to the one modeled.

The gains resulting from implementing this prediction method come at the cost of a substantially increased number of predictors in the linear specification. The influential ones are identified by a two-step penalized estimation scheme, namely adaptive least absolute shrinkage and selection operator (LASSO); for recent applications of penalized estimation in transportation problems, the reader may consult.

In the forecasting experiments models estimated can be combined using: (i) the adaptive LASSO which performs L1-penalized minimization of squared residuals and (ii) the adaptive LAD-LASSO which produces L1-penalized least absolute deviation estimators. The latter are essentially median regression estimates which have been found to be particularly effective in terms of forecasting performance when response variables possess skewed response distributions that may contain outliers It is understood that the congestion threshold calculations may be used in conjunction with other prediction methods in addition to the approach described herein above. For example, simpler methods as well may be appropriate, e.g., simple extrapolations from historical data (such as averages of values of the traffic parameter in the past), other statistical methods, be they linear regression or nonlinear methods such as neural networks, etc.

Figure 10:
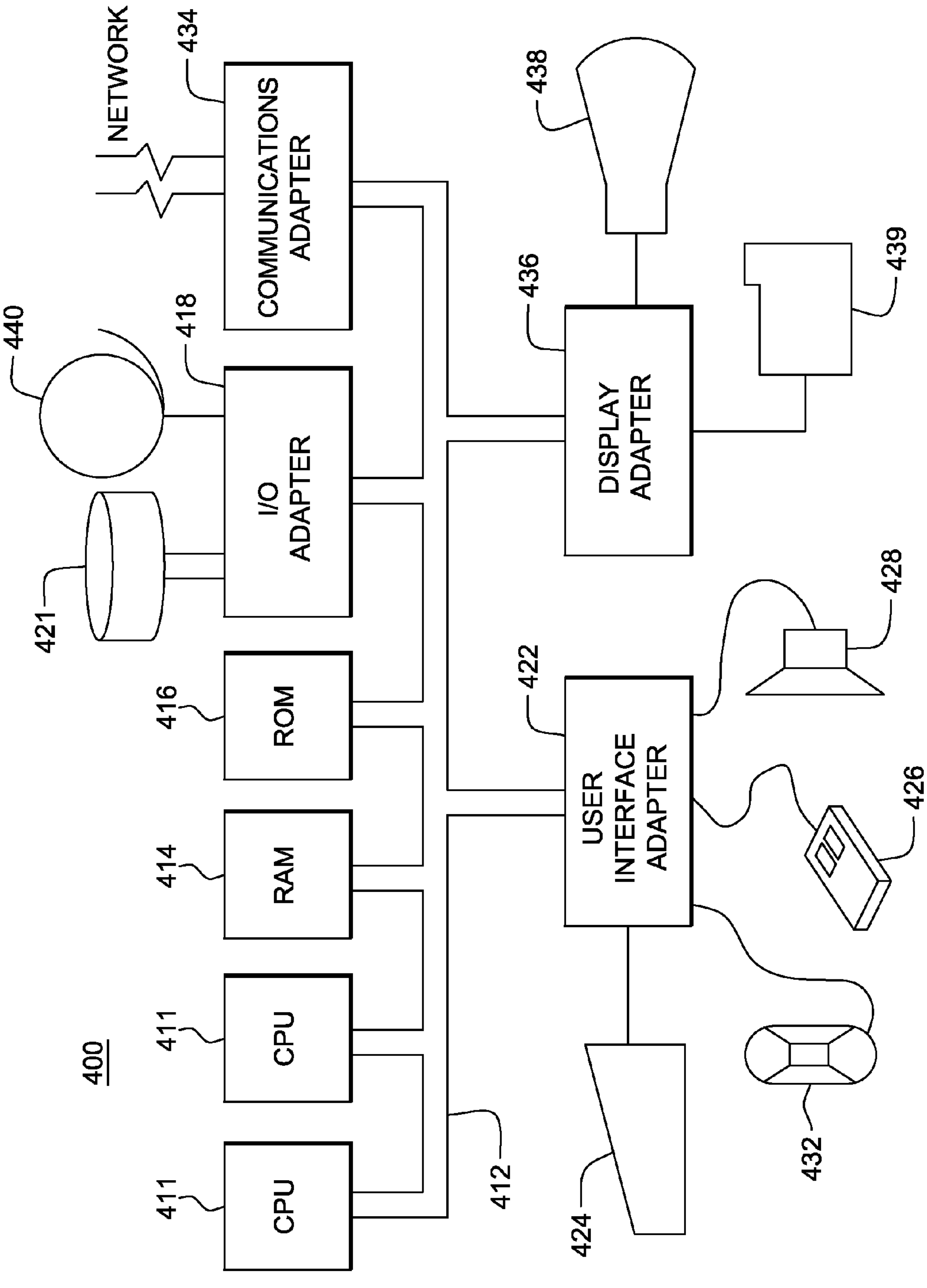
FIG. 10 illustrates an exemplary hardware configuration of a computing system infrastructure 400 in which the present methods are run.

FIG. 10 illustrates an exemplary hardware configuration of a computing system infrastructure 400 in which the present methods are run. In one aspect, computing system 400 receives both the first time-series and second or alternate time-series data and is programmed to perform the method processing steps of FIGS. 5, 6 and 9, for example. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, disk drive device 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction. The computer readable medium excludes only a propagating signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing. The computer readable medium excludes only a propagating signal.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method implemented in a computer system for managing traffic flow on a road network, the method comprising:

receiving, at the computer system, a first time-series data set having one or more values for each time point to be predicted, the first time-series data set comprising traffic occupancy levels obtained from a sensor device associated with a road of said road network;

receiving, at the computer system, a second time-series data set of one or more values per time point with correlation to the first time-series data, the second time-series data set comprising traffic volume levels at the road;

estimating, by the computer system, a functional relationship between the first time-series data and the second time-series data, for each value, over a multiplicity of time points;

determining, at the computer system, an extremal value of the functional relationship of the second time-series data as a function of the first time-series data, said extremal value representing an occupancy level at which a full congested traffic state is reached at the associated sensor device;

modifying, at the computer system, said first time-series data by projecting the occupancy level of the first time series data obtained from the associated sensor device on the extremal value so that first time-series data values that are beyond the extremal value are set to the extremal value;

using, by the computer system, said modified first time-series data in any prediction model to increase accuracy of a future predicted traffic occupancy state; and regulating a traffic flow of said road network based on said future predicted traffic occupancy state.

2. The method of claim 1, wherein first time-series data set includes a vector variable of interest, m(t), where t is a unit of time, and said second time-series data set includes an auxiliary variable, n(t), wherein said functional relationship between the first time-series data and the second time-series data, for each value, over the multiplicity of time points, is a function n(m).

3. The method of claim 2, wherein said step of determining an extremal value of the functional relationship comprises:

calibrating, for each of the time-series vector variable of interest, a curve that fits most closely data from the variable of interest and the auxiliary variable; and computing a maximum threshold value $\tau$, of the auxiliary variable beyond which value of the variable of interest is not predicted.

4. The method of claim 3, wherein said modifying said first time-series data based on the extremal value comprises:

obtaining the maximum threshold value $\tau$ of said calibrated curve, wherein $\tau$ represents an occupancy level at which a full congested state occurs; and unidimensionally projecting the occupancy level onto that threshold.

5. The method of claim 4, wherein said modifying said first time-series data is based on the following:

$$\hat{y}=\{y(t),\tau\}^{-},$$

where $\{\cdot\}^{-}$ is a minimum operation, $\hat{y}$ is said modified first time-series data, y(t) is said first time series data.

6. The method of claim 5, further comprising:

repeating said receiving first and second time-series data, said estimating, said determining, said modifying and said predicting for all elements of a variable of interest.

7. The method of claim 4, further comprising:

computing a minimal threshold value $\mu$ of the auxiliary variable;

applying a first projection according to: $m'(t)=\min\{m(t), \tau\}$, determining if a minimal threshold value $\mu$ exists, and if said minimal threshold value $\mu$ exists, applying a second projection time series variable $m''(t)=\max\{m'(t), \mu\}$, wherein said predicting is performed on said time series variable, $m''(t)$.

8. The method of claim 3, wherein said first time-series data set is road traffic data measuring traffic speeds or traffic occupancies obtained from said associated sensor device, and the second time-series data set is road traffic data measuring traffic volumes, wherein said modifying said first time-series data based on the extremal value comprises:

obtaining the maximum threshold value $\tau$ of said calibrated curve, for every associated sensor device, s, wherein $\tau_s$ represents an occupancy level at which a full congested state occurs at said associated sensor device s; and unidimensionally projecting the occupancy level onto that threshold according to:

$$\hat{y}_s=\{y_s,\tau_s\}^{-},$$

where $\{\cdot\}^{-}$ is a minimum operation, $\hat{y}_s$ is said modified first time-series data for the associated sensor device s, y(t) is said first time series data for the associated sensor device s.

* * * * *